US007801424B2

(12) United States Patent
Cheung

(10) Patent No.: US 7,801,424 B2
(45) Date of Patent: Sep. 21, 2010

(54) STEAM GENERATOR

(75) Inventor: Chun Ming Cheung, Queen's Road Central (HK)

(73) Assignee: Technical (HK) Manufacturing Limited, Hong Kong, SAR (HK)

( * ) Notice: Subject to any disclaimer, the term of this patent is extended or adjusted under 35 U.S.C. 154(b) by 777 days.

(21) Appl. No.: 11/708,251

(22) Filed: Feb. 20, 2007

(65) Prior Publication Data

US 2007/0223894 A1 Sep. 27, 2007

(30) Foreign Application Priority Data

Feb. 20, 2006 (GB) .................................... 0603314

(51) Int. Cl.
*B01D 3/06* (2006.01)

(52) U.S. Cl. ....................... 392/399; 392/465; 392/385; 392/479

(58) Field of Classification Search ................. 392/385, 392/399, 401, 402, 465, 479, 480, 481
See application file for complete search history.

(56) References Cited

U.S. PATENT DOCUMENTS 3,782,456 A * 1/1974 Gusmer ....................... 165/164
3,807,366 A * 4/1974 Murtland, Jr. .............. 122/18.1
3,835,294 A * 9/1974 Krohn et al. ................ 392/484
4,246,871 A 1/1981 Bocksruker et al.
4,371,777 A * 2/1983 Roller et al. ................ 392/480
4,460,819 A * 7/1984 Eugster ....................... 392/484
4,818,843 A * 4/1989 Swiatosz ..................... 392/397
4,833,298 A * 5/1989 Wilkins ....................... 392/399
4,836,145 A * 6/1989 Ronchi nee Marchesin . 122/4 A
4,990,745 A * 2/1991 Bayles et al. ............... 392/386
5,265,318 A * 11/1993 Shero .......................... 29/447
5,724,478 A * 3/1998 Thweatt ...................... 392/484
5,949,958 A * 9/1999 Naperkowski et al. ...... 392/399
6,031,969 A * 2/2000 Burr et al. ................... 392/404
6,053,435 A * 4/2000 Hung .......................... 239/590
6,330,395 B1 * 12/2001 Wu ............................ 392/494
6,701,069 B1 * 3/2004 Cezayirli et al. ............ 392/490
6,898,820 B2 * 5/2005 Kasper et al. ................ 15/320
6,912,357 B2 * 6/2005 Bissonnette et al. .......... 392/465
2003/0142965 A1 * 7/2003 Tsen .......................... 392/397
2006/0005345 A1 * 1/2006 Lam ............................ 15/320
2009/0106929 A1 * 4/2009 Oh et al. ....................... 15/321

FOREIGN PATENT DOCUMENTS

| | | | |
|---|---|---|---|
| EP | 1010937 | A1 | 6/2000 |
| EP | 1475578 | A1 | 11/2004 |
| GB | 2384845 | A | 8/2003 |
| GB | 0603313.6 | | 6/2006 |
| WO | WO 2004/005605 | A1 | 1/2004 |

* cited by examiner

*Primary Examiner*—Thor S Campbell
(74) *Attorney, Agent, or Firm*—Daniel B. Schein, Esq.

(57) ABSTRACT

A steam generator comprising a heating unit, a pump adapted to deliver a controllable flow of water from a water supply into the heating unit and an outlet for steam from the heating unit; the heating unit comprises a housing, a heating element disposed in the housing and a conduit for water and steam extending from the inlet to the outlet; the conduit includes a passageway extending in an elongate path in contact with or adjacent the heating element; wherein the housing comprises two portions releasably seamed together to provide a channel between the portions to receive the heating element and to provide the passageway.

15 Claims, 6 Drawing Sheets

STEAM GENERATOR

BACKGROUND OF THE INVENTION

This invention relates to a steam generator particularly but not exclusively of the kind incorporated into hand held or portable apparatus for domestic or commercial uses, for example for cleaning or steaming carpets or textile articles. The steam generator may be used in carpet cleaners, clothes presses and irons, dental or jewellery cleaning equipment and for culinary or domestic sterilizers.

Conventional steam generators for carpet cleaners, irons and the like are very bulky, heavy and include a boiler for boiling and maintaining a supply of heated water. This means that energy is expended in heating a large volume of water prior to use and in maintaining the water at elevated temperature.

SUMMARY OF THE INVENTION

According to the present invention, a steam generator comprising a heating unit, pump adapted to deliver a controllable flow of water from a water supply into the heating unit and an outlet for steam from the heating unit; the heating unit comprising a housing, a heating element disposed in the housing and a conduit for water and steam extending from the inlet to the outlet; the conduit including a passageway extending in an elongate path in contact with or adjacent the heating element; wherein the housing comprises two portions releasably secured together to provide a channel between the portions to receive the heating element and to further provide the passageway.

In a preferred embodiment the heating element extends lengthwise within the housing and the conduit extends in a helical path around the heating element. Alternatively the conduit may extend in a zig-zag, folded or other convoluted path adjacent or in contact with the heating element.

Preferably, the heating element may be folded to form two or more limbs around which the conduit forms two or more helical coils.

Alternatively the conduit may be folded extending repeatedly along the length of the heating element.

In a preferred embodiment, the heating element may be a resistive element and may be C-shaped or U-shaped so that the electrical connections are conveniently located at a suitable distance apart at one end of the housing to facilitate the connections to the power supply.

A control valve may be provided to regulate the flow of water into the pump from a water supply. The water supply may comprise a water tank integral with the apparatus or connected thereto. Alternatively a mains water supply be connected by means of a hose or other tubing.

In a preferred embodiment, the heating element forms part of a wall of the conduit. In this way water passes directly in contact with the heating element facilitating rapid heating and minimising thermal losses.

In a preferred embodiment the housing may comprise two half portions defining the channel adapted to receive the heating element, the channel including one or more continuous flanges adapted to divide the channel surrounding the heating element into one or more helixes or spirals for circulation of water or steam around the element.

In a particularly preferred embodiment, the channel comprises an axial cylindrical portion which provides a socket for reception of the heating element. The cylindrical portion may be U-shaped, C-shaped or otherwise folded. The channel further comprises an outer passageway for water and/or steam around the socket. A continuous spiral or helical flange extends radially inwardly from the outer wall of the passageway, the flange having an axial bore or aperture to define the cylindrical portion. In this way the element is securely engaged by the spiral or helical surface of the flange along the length of the passageway.

Preferably, the housing is divided into two releasably secured portions, for example half portions, the channel and passageway being divided diametrically so that the spiral or helical flange is also divided diametrically into a multiplicity of semicircular flange plates. Each flange plate has a semicircular axial cutaway portion within which the element is received in use.

Each flange plate is preferably sinusoidal in profile, so that one end of the plate engages a first upper end of a flange member in the opposite housing portion and the other lower end of the plate engages a lower flange member in the opposition housing portion to form a continuously helical path around the heating element.

In use of the apparatus water is forced to run through the helical coiled or folded path increasing the contact time between the water and heating element. This provides optimal efficiency of steam generation. The longer the water is in contact with the element, the more thermal energy is used to generate steam. Since the chamber is enclosed, pressure is developed. The higher steam pressure created results in a higher steam temperature.

In preferred embodiments the conduit comprises a labyrinthine passageway to maximise heating of the steam. One or more regions of restricted cross sectional area may be provided to restrict the flow of water or steam to enhance the pressure of steam generated.

The pump is used to ensure that the steam pressure inside the steam chamber does not exceed a predetermined maximum operating pressure. A pump capable of delivering a pressure of five times atmospheric pressure may be used in a preferred embodiment. The use of a higher pump pressure increases the steam pressure so that the water is superheated. For example a one atmospheric pressure gives a steam temperature of 100° C. and a five times atmospheric pressures gives a steam temperature of 150° C. A steam temperature of 105-110° C. may be used for most applications of the apparatus.

The apparatus preferably includes a thermostat to interrupt electrical power to the heating element when the temperature detected in the conduit or steam chamber exceeds a predetermined temperature.

A second thermostat may be employed to interrupt electrical power to the pump when the temperature in the steam chamber of the housing falls below a predetermined minimum temperature. This ensures that only steam and not water is ejected from the outlet, for example during start up.

The housing may incorporate a centre inlet pipe or duct to preheat water before contacting with the heating element. In this embodiment, cold water passes initially through the centre of the housing to absorb heat from the housing. In this way thermal energy which may be otherwise lost from the housing is used to preheat the water.

A steam generator of the present invention is efficient and is advantageous in comparison to conventional big boiler type steam generators. Smaller boiler type steam generators may only generate small bursts of steam whereas apparatus in accordance with the present invention may provide a continuous supply of steam.

Since a boiler is not used, it is not necessary to wait for the boiler to cool before adding further water. This allows use of a smaller water tank than in conventional steam generators.

A fast start up time is achieved, for example 1.5 to 2 minutes. Conventional boiler type steam generators may take ten minutes to reach operating temperature.

The power consumption of a steam generator in accordance with this invention may be 900 W that being more efficient in comparison to 1500 W of a conventional big boiler type steamer.

The flow of water into the steam chamber or conduit is controlled in order to control the amount of steam generated. A boiler type steam generator cannot be controlled in this way and is therefore unresponsive. In addition a generator in accordance with the present invention only heats the water required to be converted into steam. It is not necessary to heat a water supply prior to use.

The invention is further described by means of example but not in any limitative sense with reference to the accompanying drawings of which:

DETAILED DESCRIPTION OF THE PREFERRED EMBODIMENT

Figure 1:
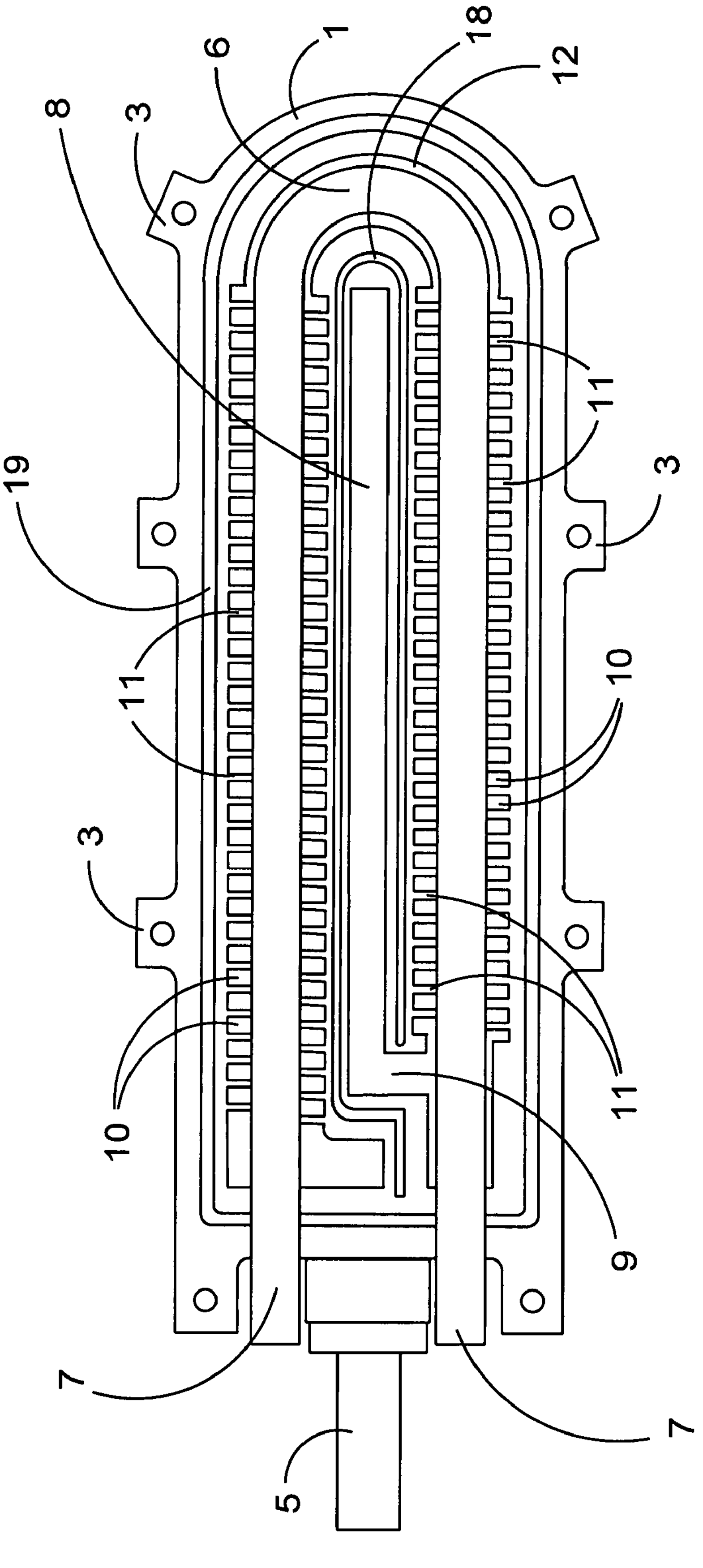
FIG. 1 is a plan view of the bottom housing of a steam generator in accordance with this invention.
Figure 2:
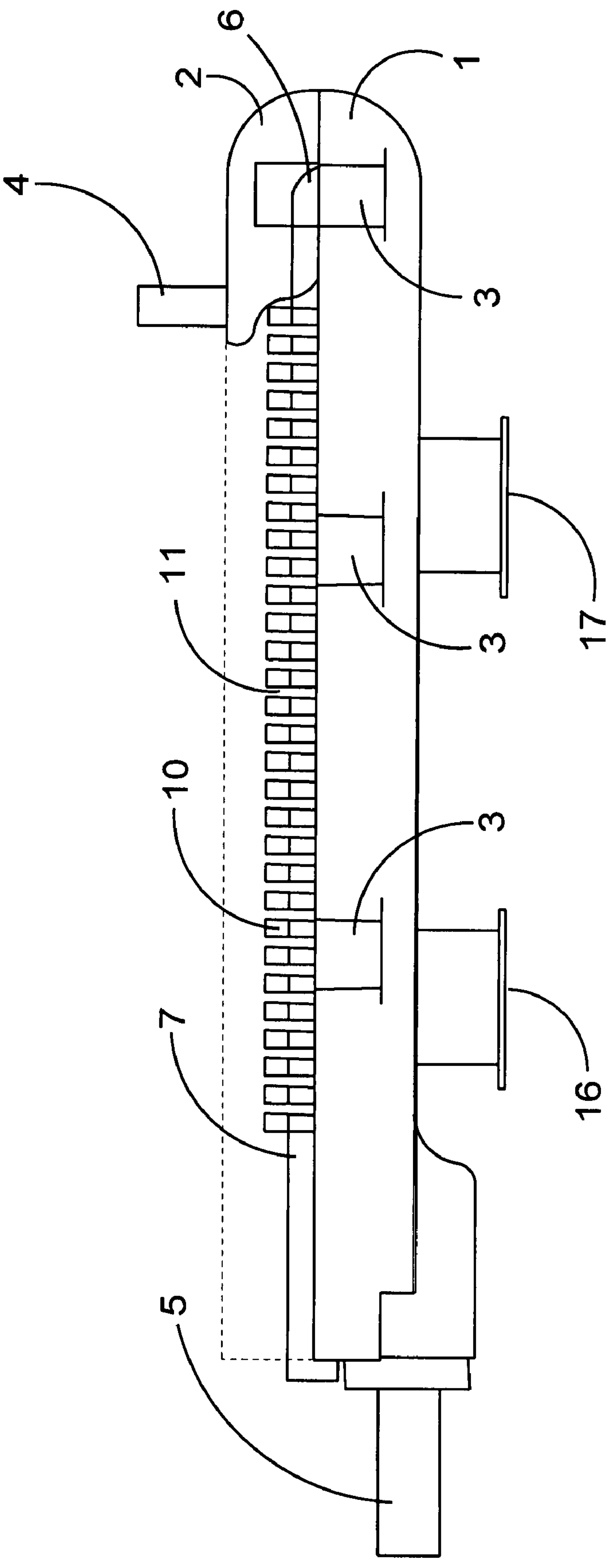
FIG. 2 is a side elevation of the housing shown in Figure.
Figure 3:
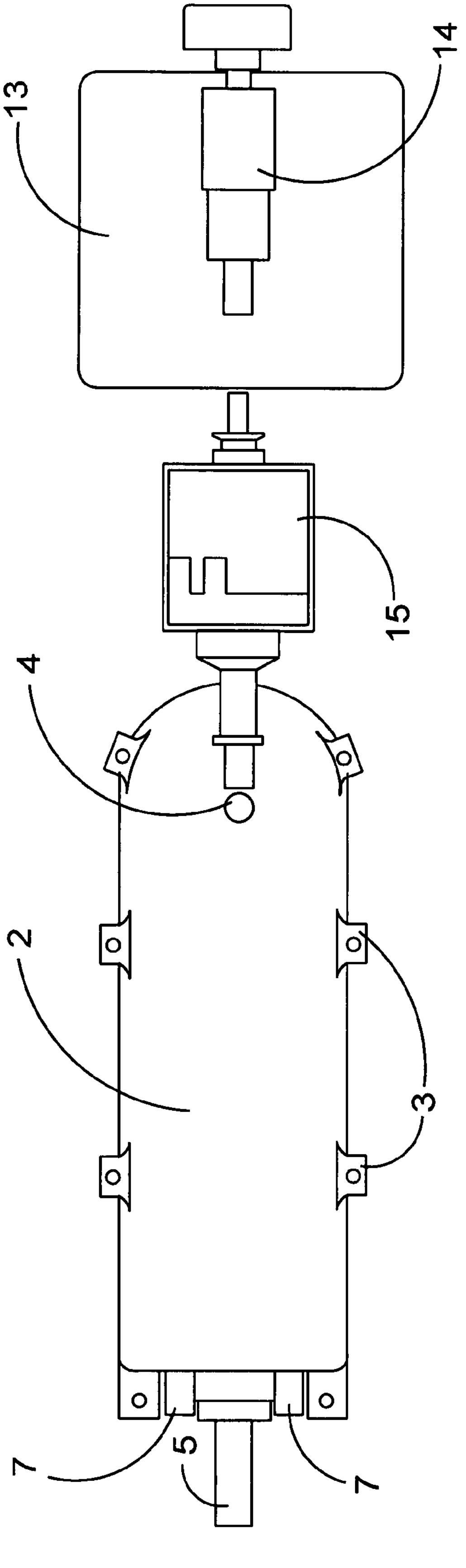
FIG. 3 is a plan view of the generator.
Figure 4:
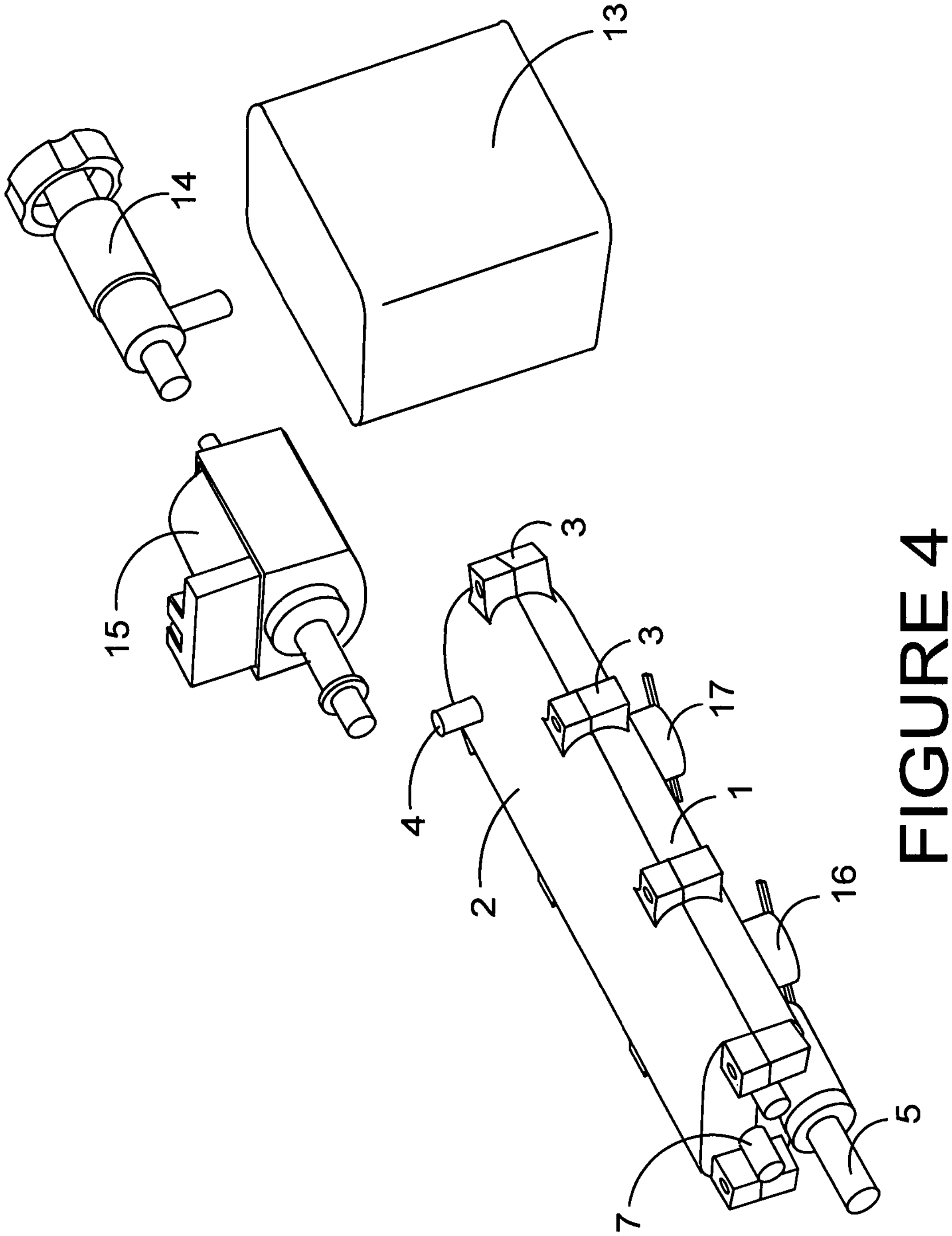
FIG. 4 is an exploded perspective view of the generator.
Figure 5:
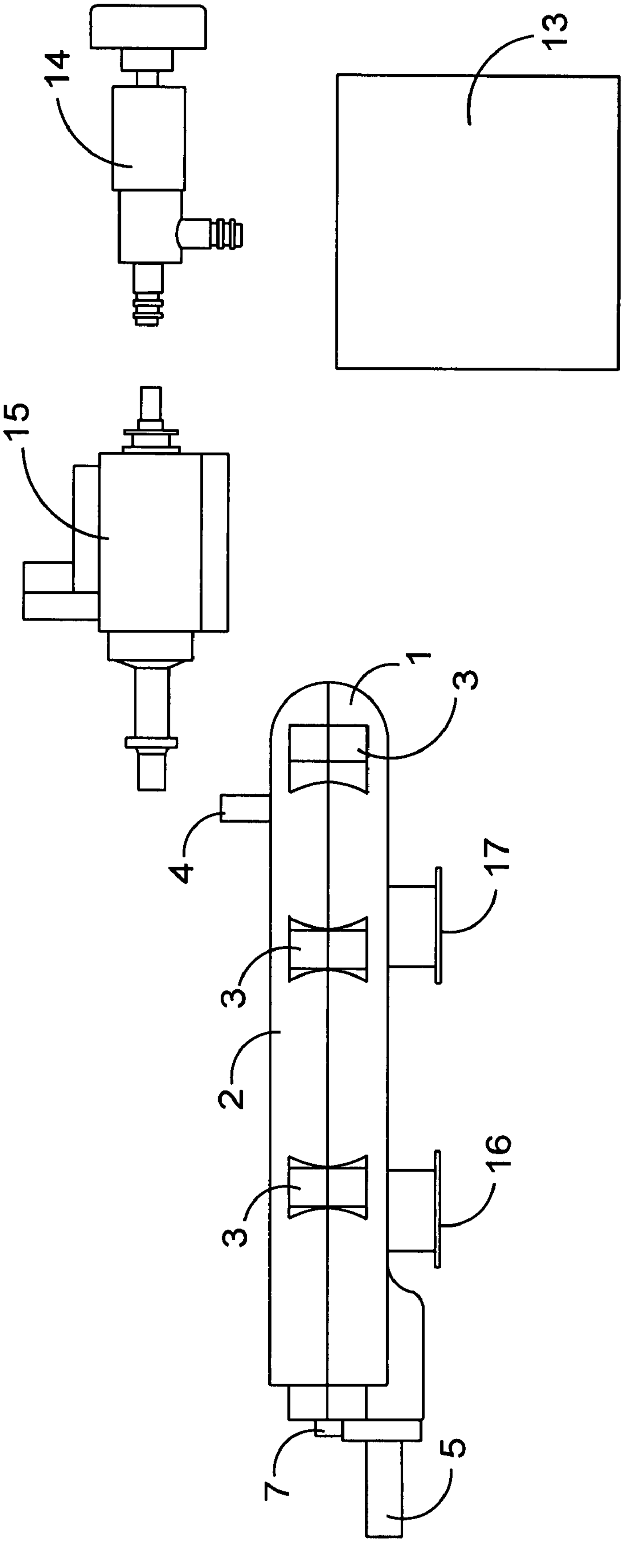
FIG. 5 is an exploded side elevation of the generator.

The steam generator shown in the drawings comprises a lower housing (1) adapted to be secured to an upper housing (2) by means of bolted flanges (3). The upper and lower housing portions (1, 2) may comprise zinc or other metallic castings and are most preferably elongate having an inlet (4) for water and an outlet (5) for steam. A U-shaped heating element (6) having two parallel limbs (7) is received in a complementary dimensioned channel located between engaging surfaces of the housing half portions (1, 2). The conduit comprises a preheat section (8) extending from the inlet (4) lengthwise of the housing to an elbow portion (9) contacting one end of the element (6). The conduit extends along the limb (7) of the element (6) to define a chamber (10) along which water and steam may pass. A multiplicity of rib shaped flange plates (11) formed in each housing portion (1, 2) extend inwardly from the housing shell to contact the heating element limb (7). The flange plates (11) are disposed so that the two half housing portions (1, 2) may be assembled to form a continuous helical spiral chamber extending the length of the limb (11) towards the curved end (12) of the element. The conduit extends from the helical coil (11) to form a region of restricted cross sectional area surrounding the curved element end (12) to form a second helical spiral extending the length of the second limb (7) of the element. In an alternative embodiment, the helical spiral extends continuously around the curved end of the element. At the end of the element the conduit communicates with the steam outlet (5).

Figure 6:
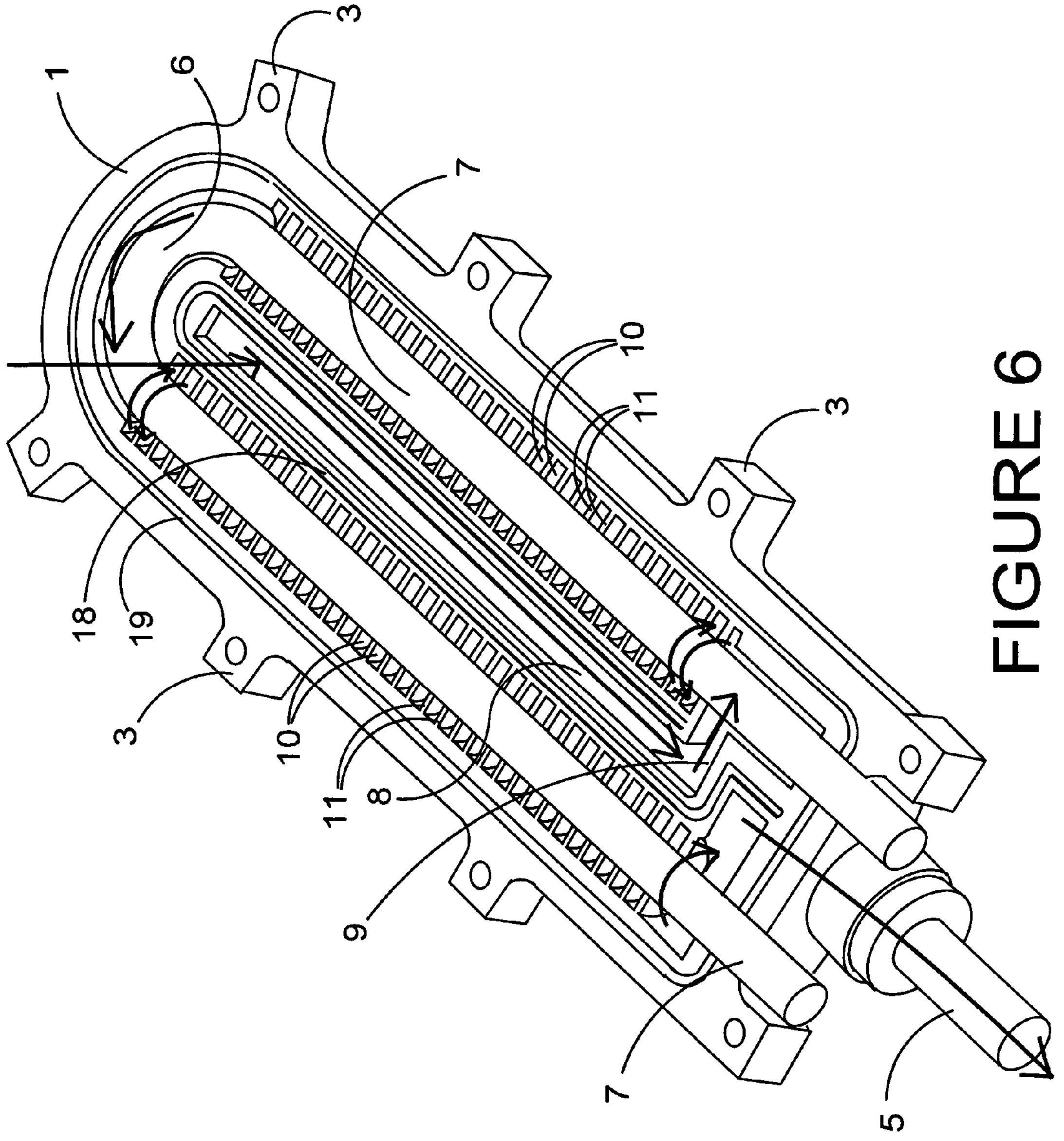
FIG. 6 is a perspective view of the bottom housing illustrating water flow in use.

FIG. 6 shows the cylindrical heating element (7) received in a correspondingly dimensioned cylindrical channel in the housing (1), the channel being formed by semicircular rebates in the flange plates (11). The element (7) is securely engaged and co-operates with the flange plates (11) to form a continuous helical passageway for water and steam to pass from the inlet to the outlet. The continuous flange formed by engagement of the two sets of flange plates (11) extends radially inwardly from the wall of the passageway. Each flange plate is sinusoidal in shape or otherwise inclined to the axis of the element so that the radially extending end surfaces of each flange plate (11) engage corresponding radially extending surfaces of a pair of opposed flange plates in the opposite half portion of the housing. In this way, each flange plate engages two opposed flange plates to form a continuous helical passageway through the housing.

A water container or tank (13) connected by an adjustable valve (14), for example a needle valve to an electric pump (15). The pump (15) is adapted to pump water at a pressure of five atmospheres into the inlet (4) of the heating chamber. The pump pressure which may be fixed or adjustable, is selected to provide a predetermined water pressure into the heating apparatus. The labyrinthine construction of the conduit allows steam pressure to be maintained in order to generate super heated steam. The rate of flow of water into the pump may be controlled by the valve in order to control the amount of steam generated by the apparatus.

A thermostat (16) attached to the casing serves to interrupt electrical power to the element and pump when a maximum operating temperature is exceeded. A second thermostat (17) serves to activate when a minimum operating temperature is reached in order to ensure that all water passing through the apparatus is converted into steam.

An inner seal or gasket 18 serves to isolate the water flow in the preheat section 8 and an outer seal or gasket 19 serves to prevent leakage of water from the casing of the steam generator.

It should be apparent to one skilled in the art that the above described embodiments are merely illustrative of but a few of the many possible specific embodiments of the present invention. Numerous and varied other arrangements can be readily devised by those skilled in the art without departing from the spirit and scope of the invention.

What is claimed is:

1. A steam generator comprising a heating unit, a pump adapted to deliver a controllable flow of water from a water supply into said heating unit and an outlet for steam from said heating unit; wherein said heating unit comprises a housing, a heating element disposed in said housing and a conduit for water and steam extending from an inlet to said outlet; said conduit includes a passageway extending in an elongate path in contact with or adjacent said heating element; wherein said housing comprises two portions releasably seamed together to provide a channel between said portions to receive said heating element and to provide said passageway, wherein said heating element extends lengthwise within said housing and said conduit extends in a helical path around said element.

2. A steam generator as claimed in claim 1, further comprising a control valve to regulate the flow of water into said pump from a water supply.

3. A steam generator, comprising a heating unit, a pump adapted to deliver a controllable flow of water from a water supply into said heating unit and an outlet for steam from said heating unit; wherein said heating unit comprises a housing, a heating element disposed in said housing and a conduit for water and steam extending from an inlet to said outlet; said conduit includes a passageway extending in an elongate path in contact with or adjacent said heating element; wherein said housing comprises two portions releasably seamed together to provide a channel between said portions to receive said heating element and to provide said passageway, wherein said heating element forms a wall of said conduit.

4. A steam generator, comprising a heating unit, a pump adapted to deliver a controllable flow of water from a water supply into said heating unit and an outlet for steam from said heating unit; wherein said heating unit comprises a housing, a heating element disposed in said housing and a conduit for water and steam extending from an inlet to said outlet; said conduit includes a passageway extending in an elongate path in contact with or adjacent said heating element; wherein said housing comprises two portions releasably seamed together to provide a channel between said portions to receive said heating element and to provide said passageway, wherein said housing comprises two half portions defining a channel adapted to receive said heating element, said channel including one or more continuous flanges adapted to divide said channel surrounding said heating element into a helical spiral.

5. A steam generator as claimed in claim 1, further comprising a thermostat adapted to interrupt power to said heating element when said conduit or steam chamber exceeds a predetermined pressure.

6. A steam generator as claimed in claim 1, further comprising a thermostat adapted to interrupt electrical power to said pump when the temperature in said steam chamber falls below a predetermined minimum temperature.

7. A steam generator as claimed in claim 1 further comprising a centre inlet pipe to preheat water before contacting said heating element.

8. A steam generator as claimed in claim 3, further comprising a control valve to regulate the flow of water into said pump from a water supply.

9. A steam generator as claimed in claim 3, further comprising a thermostat adapted to interrupt power to said heating element when said conduit or steam chamber exceeds a predetermined pressure.

10. A steam generator as claimed in claim 3, further comprising a thermostat adapted to interrupt electrical power to said pump when the temperature in said steam chamber falls below a predetermined minimum temperature.

11. A steam generator as claimed in claim 3, further comprising a centre inlet pipe to preheat water before contacting said heating element.

12. A steam generator as claimed in claim 4, further comprising a control valve to regulate the flow of water into said pump from a water supply.

13. A steam generator as claimed in claim 4, further comprising a thermostat adapted to interrupt power to said heating element when said conduit or steam chamber exceeds a predetermined pressure.

14. A steam generator as claimed in claim 4, further comprising a thermostat adapted to interrupt electrical power to said pump when the temperature in said steam chamber falls below a predetermined minimum temperature.

15. A steam generator as claimed in claim 4, further comprising a centre inlet pipe to preheat water before contacting said heating element.

* * * * *